United States Patent [19]

Dinsdale et al.

[11] 4,061,952

[45] Dec. 6, 1977

[54] COMPUTER-CONTROLLED MACHINE TOOL

[75] Inventors: Jack Dinsdale, Olney; David Wallace McQue, Milton Keynes; Geoffrey Vorley, Sheppey, all of England

[73] Assignee: Cranfield Institute of Technology, England

[21] Appl. No.: 568,056

[22] Filed: Apr. 14, 1975

[51] Int. Cl.$^2$ ............................................. G05B 19/24
[52] U.S. Cl. .................................... 318/572; 318/561;
51/165.87
[58] Field of Search ............... 318/561, 569, 572, 574,
318/579; 51/101 R, 165 R, 165.87, 165.77,
165.71

[56] References Cited

U.S. PATENT DOCUMENTS

| | | | |
|---|---|---|---|
| 3,653,161 | 4/1972 | Clark | 318/569 |
| 3,688,444 | 9/1972 | Uhtenwoldt et al. | 51/165 R |
| 3,746,956 | 7/1973 | Takegawa | 318/572 |
| 3,748,562 | 7/1973 | Takegawa et al. | 318/572 |
| 3,798,840 | 3/1974 | Robillard et al. | 51/165.87 X |
| 3,842,545 | 10/1974 | Possati | 51/165.71 |
| 3,887,857 | 6/1975 | Elbling | 318/572 |
| 3,917,930 | 11/1975 | Davey et al. | 235/151.11 |
| 3,940,675 | 2/1976 | Schroeder | 318/603 |

Primary Examiner—Robert K. Schaefer
Assistant Examiner—John J. Feldhaus
Attorney, Agent, or Firm—Haseltine, Lake & Waters

[57] ABSTRACT

A control system for a grinding machine or other machine tool, wherein desired workpiece profiles are stored in a digital computer which controls the position of a tool in relation to a workpiece in accordance with the stored profile and in accordance with the position of a workpiece profile follower to compensate for tool wear.

12 Claims, 9 Drawing Figures $$R'_{Cwi} = R_{Cwj-1} + (R_{Cwj} - R_{Cwj-1}) \times \frac{\theta'_i - \beta_{j-1}}{\beta_j - \beta_{j-1}}$$

COMPUTER-CONTROLLED MACHINE TOOL

BACKGROUND OF THE INVENTION

This invention relates to machine tools, such as grinding machines, in which a workpiece to be machined is rotated about an axis whilst being acted upon by a tool which is operated to remove materials from a surface of the workpiece.

Such machine tools are well known and can be used in the production of articles having an irregular profile, such as an internal or external cam. In this instance, a cam workpiece or blank is rotated about an axis, and a grinding wheel is moved radially of that axis in dependence upon the angular position of the workpiece to produce the desired profile.

One way in which the tool movement can be controlled is to utilise a master cam produced to a high degree of accuracy and engaged by a follower coupled to the tool to effect the required movement of the tool. The production of the master cam involves a considerable expense since it requires highly skilled labour to produce. Furthermore, considerable time is required to produce the master cam and it is therefore difficult to introduce new designs or modify existing designs.

SUMMARY OF THE INVENTION

According to the invention, there is provided a control system for controlling the position of a rotating tool acting on a workpiece, the system comprising: first motor means for adjusting the position of the tool; first position sensor means for providing a first digital signal representing the actual position of the tool; comparator means responsive to any difference between the values represented by the first digital signal and a second digital signal indicative of a desired position for the tool, for controlling the first motor means so as to reduce the difference; second position sensor means for providing a third digital signal indicative of the actual angular position of the workpiece; third position sensor means for providing a fourth digital signal representative of the position of a follower engaging the machined surface of the workpiece at a position angularly spaced from the tool in relation to the axis of angular movement of the workpiece; and digital computer means having a store for information defining a desired profile for the workpiece, the second and third sensor means being coupled to feed the computer means which is programmed to produce said second digital signal in dependence upon a selected portion of said stored information, which portion is selected by use of the third signal and is modified in dependence upon the fourth digital signal to compensate for tool wear.

According to a preferred embodiment, the control system includes second motor means for moving the workpiece angularly, said computer being programmed to provide a control signal for the second motor means, e.g. so that the cutting speed between the tool and the surface of the workpiece is maintained substantially constant. Alternatively the workpiece could be rotated at a constant speed set by the computer.

BRIEF DESCRIPTION OF THE DRAWINGS

For a better understanding of the invention and to show how the same may be carried into effect, reference will now be made, by way of example, to the accompanying drawings in which.

DESCRIPTION OF THE PREFERRED EMBODIMENT

Figure 1:
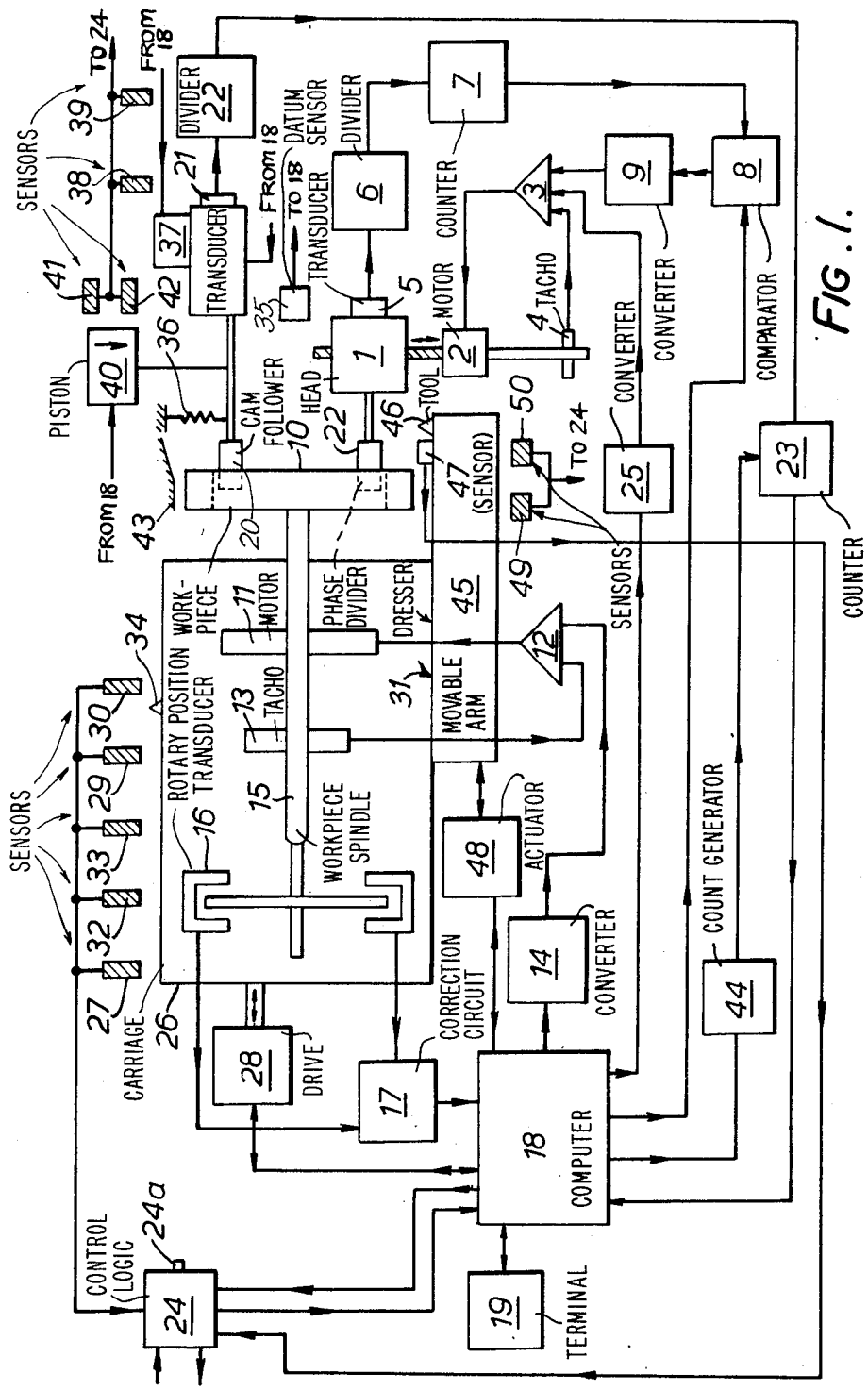
FIG. 1 is a diagram of a machine tool with a control system.

The machine tool shown in FIG. 1 is designed for grinding a profile on the internal periphery of an annular workpiece to produce a cam ring (although the invention can also be applied to the formation of external cams). The cam ring workpiece is indicated at 10, and is assumed already to have a cam profile approximating to the final form. The cam ring is intended to form part of a fuel injection pump for supplying fuel to internal combustion engines. The cam profile which is machined on the internal peripheral surface of the cam ring must be formed to a high degree of accuracy and, for producing the profile, a grinding wheel 22 is provided and is rotated at a high speed. The grinding wheel is mounted on the spindle of a grinding head 1, which can be moved in a direction at right angles to the axis of the cam. The movement is effected by means of a motor 2 which, in this embodiment, is an electric motor which is controlled by a servo-amplifier 3. A velocity feedback path is provided for the amplifier/motor loop by way of a tacho 4. A datum sensor 35 is provided to define a datum position for the carriage 1 with the axis of the grinding wheel 10mm from the workpiece axis. The carriage can be moved 30mm from the datum away from the axis for dressing and can also move 10mm in the opposite direction. Photo-electric sensors (not shown) define these limits. Moreover, the position of the grinding head 1, and therefore of the grinding wheel 22, is sensed by a first position sensor means, and this includes a linear transducer 5 (an optical transducer with grating and reading head), a phase divider 6 and a counter 7. The counter 7 provides a digital signal representing the actual position of the grinding head and this is supplied to a parallel digital comparator 8. The comparator 8 produces a digital output signal which is converted into an analogue signal by means of a converter 9, the output of the converter being applied to the amplifier 3 and thereby serving to control the position of the grinding head 1.

The workpiece 10 is mounted on a rotatable spindle 15 which is rotated by means of a rotor 11, which in this embodiment is an electric motor which is controlled by a servo-amplifier 12. Again velocity feedback is provided for the amplifier/motor loop by way of a tacho 13. The servo-amplifier 12 receives an input signal from a digital to analogue converter 14. Moreover, the angular position of the workpiece supporting spindle 15 is sensed by means of a rotary position transducer 16. The rotary position transducer includes a pair of reading heads the output signals of which are applied to a correction circuit 17 to compensate for any eccentricity of the spindle, the output of the correction circuit being in digital form. The correction circuit 17 also effects phase division by five, giving one pulse for every 0.04° of rotation of spindle 15. Its implementation can be seen from British Patent Specification No. 1,375,824.

The workpiece spindle 15 is supported by a carriage 26 mounted for movement in the direction of the axis of spindle 15 to advance the cam from a rest position, defined by a photo-electric sensor 27. This motion is effected by a servo motor-tacho drive 28. Photo-electric sensors 29 and 30 sense the limits of an oscillating grinding stroke traverse effected by the drive 28.

The carriage also comprises a dresser 31 for dressing the grinding wheel. Photo-electric sensors 32 and 33 sense the carriage limits for the dressing stroke. A vane, diagrammatically shown at 34 on the carriage, is used to interrupt light to the sensors 27, 29, 30, 32 and 33. The dresser comprises a movable swinging arm 45 carrying a tool 46 and a sensor 47 which senses the amount of irregularity of the grinding wheel surface. The arm is displaced by a pneumatic actuator 48 and two sensors 49 and 50 detect if the arm is up or down.

The control system also includes a digital computer 18 (e.g. a Nova mini computer) having a store which can contain information regarding the desired profile of the cam. This data may be altered in a known manner, using an input terminal 19. The computer provides a digital input signal to the comparator 8 and this signal is compared, in the comparator, with the signal derived from the counter 7. Any difference between these two signals is supplied to the amplifier 3 by way of the converter 9 so that the position of the grinding wheel 22 is determined in accordance with the desired profile of the cam. In order to do this, the computer takes into account the angular position of the cam, and for this purpose utilises the digital signal obtained from the correction circuit 17. It will be appreciated that for every angular position of the cam there will be a corresponding position of the grinding wheel so that as the cam moves angularly the grinding wheel position will vary so as to produce the desired profile. Clearly, the grinding operation must take place in stages in order to limit the load applied to the grinding wheel and this function is also achieved by the computer. Thus, except in the final stage, the signal supplied to converter 8 by the computer represents the value in the store less a predetermined amount (or plus a predetermined amount in the case of an external cam).

With the arrangement as so far described, no account is taken of the wear which can be expected of the grinding wheel as grinding proceeds. To achieve this, an indication of the actual profile of the cam is provided using a cam follower 20 which engages the cam profile at a position angularly removed, conveniently by 180°, from the grinding wheel. The position of the cam follower 20 is sensed by a second position sensor means which includes another optical transducer 21, a phase divider 22 and a counter 23. The output of the counter is a digital signal indicative of the position of the cam follower. The signal provided by the counter is temporarily stored in the computer since the measurement effected by the cam follower is taken at a point removed from the grinding wheel. The computer therefore, when providing the signal to the comparator 8, does not make use of the information immediately delivered by the counter, but selects the signal appropriate to the angular setting of the cam. In this manner, the computer also keeps account of grinding wheel wear and initiates shut-down of the machine via general control logic 24 (which also receives the signals from the sensors) if the wear exceeds a prescribed limit. The probe is held in contact with the cam by a spring 36 and can be displaced axially by a pneumatic piston 37 having two photo-electric axial limit sensors 38 and 39. Motion radially is controlled by a pneumatic piston 40 with radial limit photo-electric sensors 41 and 42. The spring 36 holds the follower against the cam or against a datum face 43 onto which the follower can be guided by a ramp.

The datum face 43 can be used to establish follower radius. With the follower against the face 43, the counter 23 is set to a count corresponding to the actual separation of the axis of the spindle 15 from the face 43. This count can be generated by a prewired arrangement 44 actuated by the computer. The computer will check the datum position, and set counter 23 if necessary, between grinding cycles.

The system also includes a further digital to analogue converter 25, and this provides a further input signal to the amplifier 3. The converter 25 receives a signal from the computer, this signal correcting for velocity lag errors which would otherwise occur when the machine tool is in operation. The computer may also provide an additional signal representing acceleration, and this additional signal may be applied to the amplifier 3 or it can be combined with the signal which is supplied to the comparator 8.

The phase dividers 6 and 22 are provided for the purpose of improving the resolution of the associated transducers. They are adjustable pulse multipliers which emit an adjustable plurality of pulses for each pulse received.

Figure 2A:
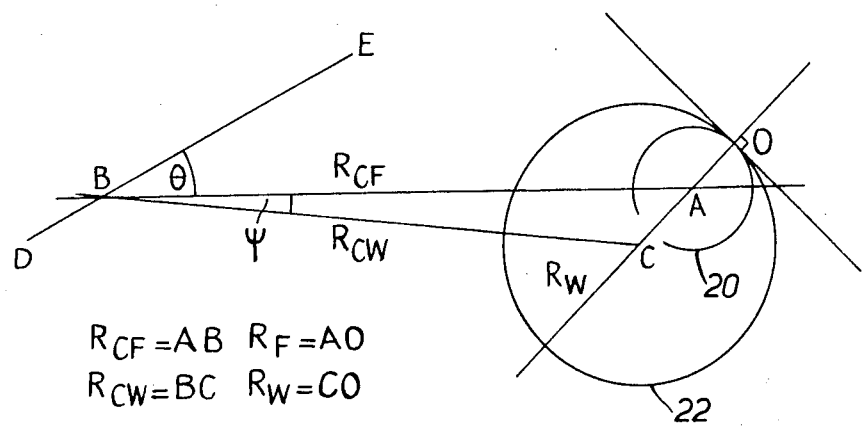
FIG. 2a is a diagram illustrating geometrical relationships in cam grinding.

Before proceeding with a detailed description of the computer programme, the mathematical relationships taken into account will now be discussed with reference to FIGS. 2a and 2c.

An important consideration that must be taken into account is the fact that the point of contact between the cam surface and the grinding wheel is not always on a line joining the axis of the cam and the axis of the grinding wheel. At many points of contact there is an offset angle and this is illustrated diagrammatically in FIG. 2a. This figure shows the tangent to the cam through a point of contact O between the grinding wheel 22 and the cam 10. For simplicity the follower 20 is also illustrated as making contact with the cam at the point O. In practice the point of contact between the follower and cam will be displaced by 180° from the illustrated position. Point B represents the axis of rotation of the cam and the line DE represents a reference direction which is fixed in space and is used as the reference for the measurement of the direction of the line BA representing the position of the follower 20. Point C in FIG. 2a represents the axis of rotation of the grinding wheel 22. From this diagram there may be deduced the following two equations:

$$(R_{cw})^2 = (R_w - R_F)^2 + (R_{CF})^2 - 2R_{CF}(R_w - R_F) \cos \alpha \tag{1}$$

$$\sin \Psi = [(R_w - R_F)/R_{CW}] \sin \alpha \tag{2}$$

where:

$R_{CW}$ = distance between B and the centre C of the grinding wheel 22, $R_{CF}$ = distance between B and the centre A of the follower, $\Psi$ = the offset angle, i.e. difference in angle between follower and wheel, $R_w$ = grinding wheel radius, $R_F$ = follower radius, $\theta$ = angle CBA represents the orientation of the follower, $\sin \alpha = \delta R_{CF}/R_{CF}\delta\theta$ $\delta R_{CF}$ = change in $R_{CF}$ for change in angle $\theta$ of $\delta\theta$ Equations (1) and (2) depend upon grinding wheel radius, which, owing to wear, is a variable in the system. A suitable approximation for the effect of changing grinding wheel radius on offset angle is given by:

$$\Psi' = \Psi(a'/a)[1 + 0.05(a' - a)] \quad (3)$$

where:

$\Psi$ = offset angle for a given wheel radius $R_w$.

$\Psi'$ = offset angle at same point when the estimate of grinding wheel radius is $R'_w$, $a = R_w - R_F$, and $a' = R'_w - R_F$.

This approximation applies when the parameters encountered are in the region of $R_{CF}$ = 20mm $\delta R_{CF}$ = 0.15mm for 1° cam rotation $R_F$ = 5mm $R_w$ = 8mm.

Initially the computer is fed in known manner with a sequence of pulses of values for $\theta$ and $R_{CF}$, there being 1800 of these pairs covering the angular range 0° to 360°, these values being denoted individually $\theta_i$ and $R_{CFi}$, where $i$ denotes the order in the sequence. Values of $\Psi_i$ are also stored and can be input with $\theta$ and $R_{CF}$ or be calculated in the computer using equation (2). $R_{CWi}$ values are also calculated using equation (1). Thus, for each discrete angular position of the cam ($\theta_i$, where $i$ = 0 to 1799 for 0.2° resolution) two items of data are provided:

i. the required final follower position at that point ($R_{CFi}$);

ii. the offset angle ($\Psi_i$) at that point, assuming initial grinding wheel radius.

As the cam is rotated, probe measurements ($R'_{CFi}$) are input to the computer and grinding wheel position demands are output at discrete increments of cam angular position.

During grinding two parameters are calculated and stored:

i. desired value of wheel position ($R_{Cwi}$) at each discrete angular position of the cam is calculated from the desired value of ($R_{CFi}$) and its measured present value ($R'_{CFi}$);

ii. the angular position ($\beta_i$) of the cam at which the value of ($R_{Cwi}$) should be output as a grinding wheel position demand. This angle is approximately 180° from the present angular position of the cam since the grinding wheel and follower are displaced in the machine by 180°.

Thus, at each discrete angular position the computer normally carries out two procedures.

The first procedure is as follows.

A probe reading ($R'_{CFi}$) is taken and compared with the required final probe reading ($R_{CFi}$) to determine the amount of metal left to be removed. Depending on the type of cut in progress (rough, fine, etc.) the value of grinding wheel position ($R_{Cwi}$) is modified.

The angle ($\beta_i$) at which $R_{Cwi}$ should be output is recalculated using the present estimate of wheel radius ($R'_w$) (the determination of which is a third procedure described below) as follows:

$$\beta_i = \theta_i + 180° + \Psi_i' \quad (4)$$

where $\Psi_i'$ is given equation 3.

The second procedure is as follows.

Figure 2B:
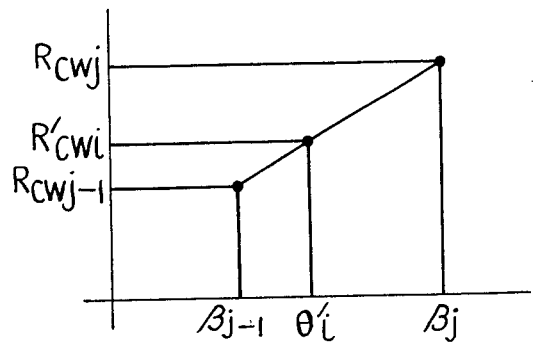
FIG. 2b is a diagram illustrating computer interpolation.

The grinding wheel position ($R'_{Cwi}$) to be output at the angular position $\beta_i$ is determined by interpolation between two values of $R_{Cwi}$ calculated approximately 180° of cam revolution before the present angular position. In order to calculate the value of $R'_{Cwi}$ the computer searches the table of stored values of $\beta_i$ until a value of $\beta_i$ is found which is greater than $\theta_i$. This value is denoted $\beta_j$. The previous value of $\beta_i$ is then less than $\theta_i$ and the values $R_{cwj}$ and $R_{cwj-1}$ can be used to calculate $R_{cwi}$ (see FIG. 2b).

This interpolation is necessary because the stored calculated values $\beta_i$ will not in general correspond exactly to the discrete values of $\theta_i$ which are used.

In order to provide velocity and acceleration feed forward for the grinding-head position servo the grinding head velocity and acceleration $V_{wi}$ and $A_{wi}$ are calculated and output, where:

$$V_{wi} = [R'_{(cwi+1)} - R'_{(cwi-1)}]C_v \quad (5)$$

$$A_{wi} = [R'_{(cwi+1)} + 2R'_{cwi} - R'_{(cwi-1)}]C_A \quad (6)$$

where $C_v$ and $C_A$ are constants depending on for example servo gain and resolution.

It is therefore necessary at angle $\theta_i$ to know $R'_{(cwi+1)}$ and the actual procedure is, at angle $\theta_i$, to calculate $R'_{(cwi+1)}$, having previously calculated and stored values of $R'_{cwi}$ and $R'_{(cwi-1)}$ at $\theta_{i-1}$ and $\theta_{i-2}$. Having calculated $R'_{(cwi+1)}$, $V_{wi}$ and $A_{wi}$, the values $R'_{cwi}$, $V_{wi}$ and $A_{wi}$ are output.

The third procedure mentioned above is to determine wheel radius.

On a constant radius section of the cam, the offset angle $\Psi$ is zero and the grinding wheel position ($R'_{cwi}$) which produces a given follower position ($R'_{cFi}$) is:

$$R'_{cwi} = R'_{cfi} + R_f - R'_w.$$

Figure 2C:
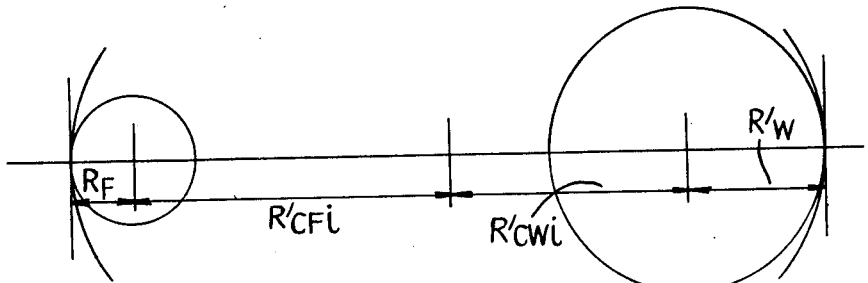
FIG. 2c is another diagram illustrating geometrical relationships in cam grinding.

This condition is shown in FIG. 2c. It is thus possible on a constant radius section of the cam, by taking the probe position reading and recalling the grinding wheel position demand used to grind that section, to calculate the present grinding wheel radius ($R'_w$) as follows:

$$R'_w = R'_{CFi} + R_F - R'_{cwi} \quad (7)$$

In practice a specific suitable constant radius section is selected before grinding starts. This "marked" section is used every revolution during grinding to recalculate the grinding wheel radius.

The constant radius section must be long enough to ensure that the grinding wheel and follower have reached stable positions on it before the radius check is carried out. A number of probe readings are taken and their average value used for $R'_{CFi}$ in equation (7).

In the programme description below it is assumed that the programme storage area already contains tables of values of $R_{CFi}$ and $\Psi_i$ for each value of $\theta_i$ for the cam to be ground.

A typical grinding sequence will now be described with reference to FIG. 3 which shows a flow chart of the computer programme concerned.

Step 51 in the flow chart senses the switching on of power which advances the programme to step 52 which causes the following operations to occur: the carriage 26 is fully retracted away from the grinding head 1; the cam follower 20 is disengaged and removed to its datum 43 which causes counter 23 to be re-set by device 44; the grinding head 1 is moved to its datum defined by sensor 35 and its counter 7 is cleared; and the dresser is moved away from the grinding wheel. When this sequence is completed, the programme passes to decision function 53 which decides whether or not a start button (24a in FIG. 1) has been depressed. When it has been depressed, function 54 is entered which causes the probe to move in an attempt to engage a cam blank 10. Function 55 tests for engagement with a cam blank, i.e. a follower position reading is taken to check whether a rough cam blank has been mounted on the spindle 15. If no cam is present, the programme returns to step 52, whilst if a cam is detected, a full set of follower readings is then taken and stored in the computer. Function 56 is then entered to cause the computer to compare the follower readings with the desired value data already present in storage. An internal cam-angle position counter of the computer is reset to give the best possible fit of the angular position of the cam blank with its desired final profile data as in storage. Function 57 then causes the stored values to be examined to determine whether there is enough metal on the cam blank to achieve the required profile. If not, the programme passes to function 62 which causes the warning signal to be emitted. The programme would then pass back to function 52. If it is found that there is sufficient metal present, function 58 is entered to cause the grinding wheel to be dressed but if this step is found not to be able to produce a suitably ground wheel (if, for example, the wheel has a large chip in it) function 59 causes the programme to pass to block 64 which causes a further warning signal to be emitted and the programme to be returned to function 52. If the dressing procedure is satisfactorily completed, the programme passes to function 60, in which the cam is ground. On completion of grinding, the cam is checked at function 61 to see whether its profile is within a required tolerance. If it is not, a further warning is emitted by way of function 62 and the programme returns to function 52. If the cam is within tolerance a pass signal is emitted at function 63 and the programme again returns to function 52.

The operation of function 56 will now be described in more detail.

The roughly formed cam is loaded into the machine at an arbitrary angle so that it is necessary to determine a suitable 0° reference point of the cam to correspond to the 0° reference point of the stored cam data.

A full 360° set of probe readings ($R'_{CFi}$) are first taken starting at any angle; the angle is monitored by a software counter containing the actual angle $\theta'_i$.

In the next stage the stored probe readings corresponding to one cam lobe ($R'_{CF0}$ to $R'_{CFn}$ where $n = (360 \times r)/N$ and $r$ = number of measured points per degree and $N$ = number of lobes on the cam) are compared with a corresponding set of cam data values ($R_{CF0}$ to $R_{CFn}$) to determine the least amount of metal to be removed ($r_{c\,min}$). If $r_{c\,min}$ is less than zero it is clearly impossible to grind the cam with this orientation since too much metal has already been removed.

A further series of comparisons is then made using a series of offset values $\alpha_1$ to $\alpha_n$ to shift the starting point of the measured data by up to one lobe and thus determine an offset which gives the best fit on the first lobe.

Having oriented the first lobe, the other lobes are checked and final adjustments are made to the offset to obtain a best fit all round. The contents of the angle counter are then modified by the final best offset. If the best fit does not leave at least a minimum amount of metal all round, the cam is rejected.

Figure 4:
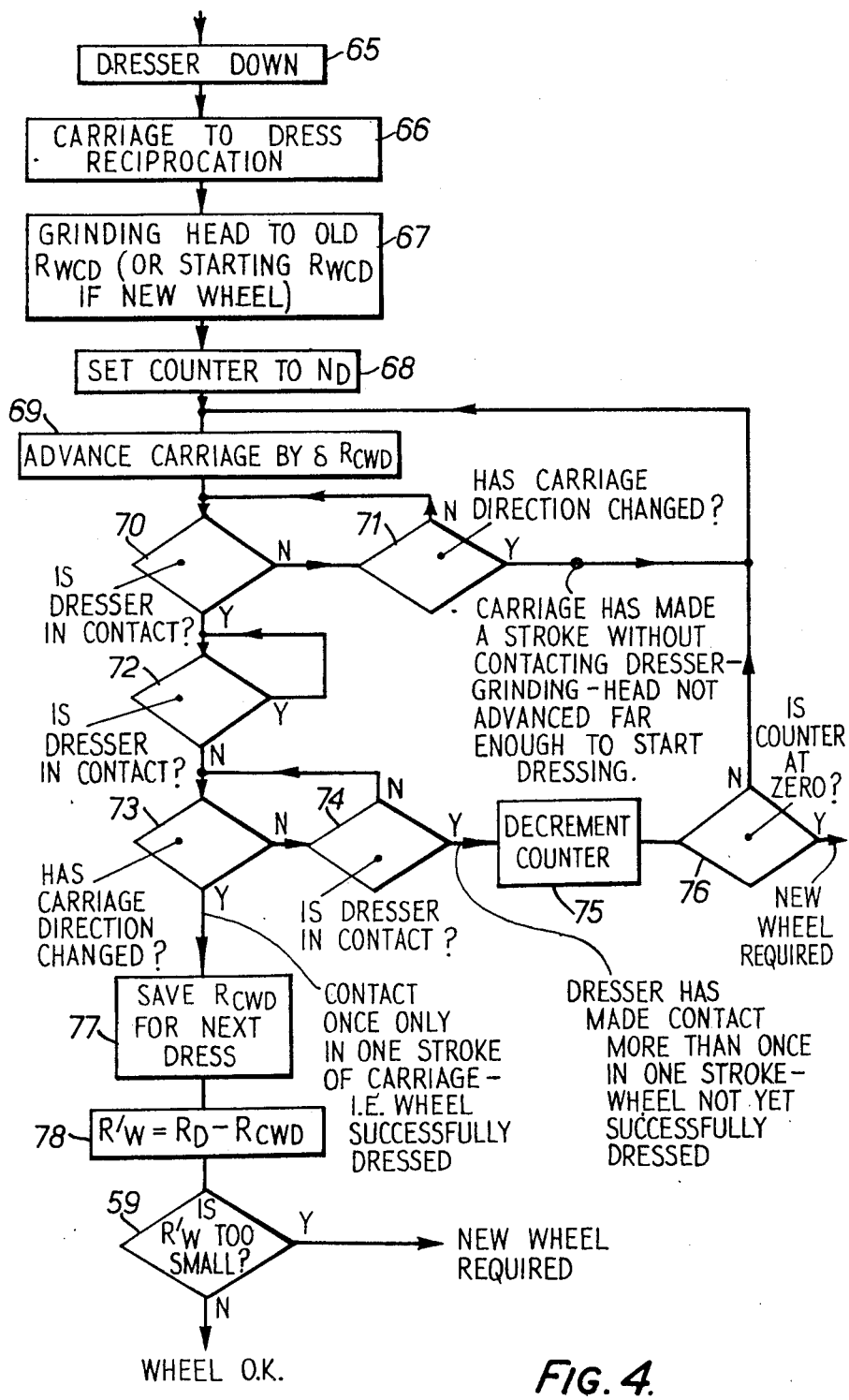

Function 58 will now be described with reference to the flow chart of FIG. 4 and with reference to the drawing of FIG. 1. As already indicated, the grinding wheel is dressed by a diamond 46 mounted on a pneumatically actuated arm 31 which is controlled by the computer via a solenoid value 48 to enable the dresser to be brought into operation when required. A transducer in the dresser arm 45, combined with an electronic control unit, provides a signal to the computer when the diamond is in contact with the wheel. The dressing sensor 47 and the electronic control unit are manufactured by UVA, Ulvsunda Verkstader AB.

The programme is entered at function 65 which causes the arm 45 to be displaced to move the diamond 46 into its dressing position. Function 66 is then entered to cause the carriage 26 to reciprocate between its two predetermined dressing limits so that the diamond 46 passes over the whole length of the grinding wheel. Function 67 is then entered to cause the carriage 1 to move the grinding wheel 22 to the last utilised radial position for dressing ($R_{cwd}$) or a new value if it is a new wheel.

Function 68 is then entered to set a software counter to a value $N_d$ which is the number of dressing cycles to be effected.

At each stroke, the grinding wheel is advanced by a predetermined radial amount ($R_{CWD}$) so that the wheel is cut. On each occasion functions 70 and 71 ensure that contact between the diamond and the grinding wheel is maintained. Function 71 can return the programme to function 69 if the work head has done a stroke without contact with the diamond, because the grinding wheel carriage has not advanced far enough to start dressing. Dresser contact sensing is repeated by functions 72 and 73, leaving function 73 to enter function 77 if contact is made only once in one stroke of the carriage 26, i.e. in the case that the wheel is successful dressed. If it is not successfully dressed, function 74 is entered and from there the programme can proceed to function 75 to decrement the aforementioned software counter which, when it does not read zero, returns the programme from function 76 to function 69. If the wheel cannot be successfully dressed, therefore, after the predetermined number of attempts, it is declared unsuitable and dressing is abandoned. At the end of dressing the grinding wheel radius $R'_w$ can be calculated and saved for use during grinding by the following equation:

$$R'_w = R_D - R_{CWD},$$

where
$R_D$ = dresser position relative to cam axis of rotation
$R_{CWD}$ = wheelhead position at the end of the dressing process.

Figure 3:
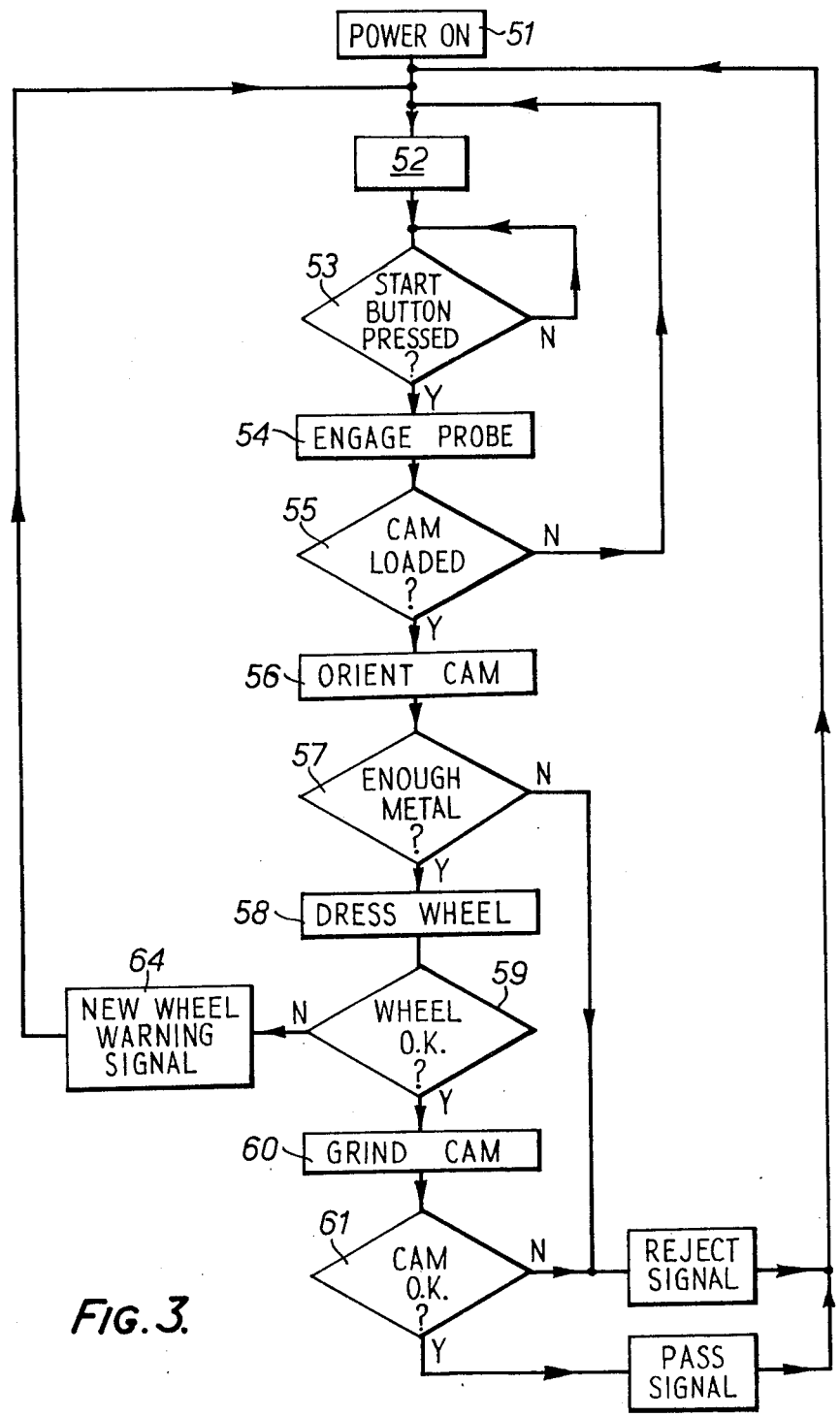
FIGS. 3, 4, 5a, 5b and 6 are flow charts defining a computer programme.

These end of dressing operations are carried out by functions 77 and 78 which leads to function 59 which tests whether the calculated value of $R'_w$ is too small thereby to determine whether or not a signal should be emitted to give warning of whether a new wheel is required at function 64 (FIG. 3).

Figure 5A:
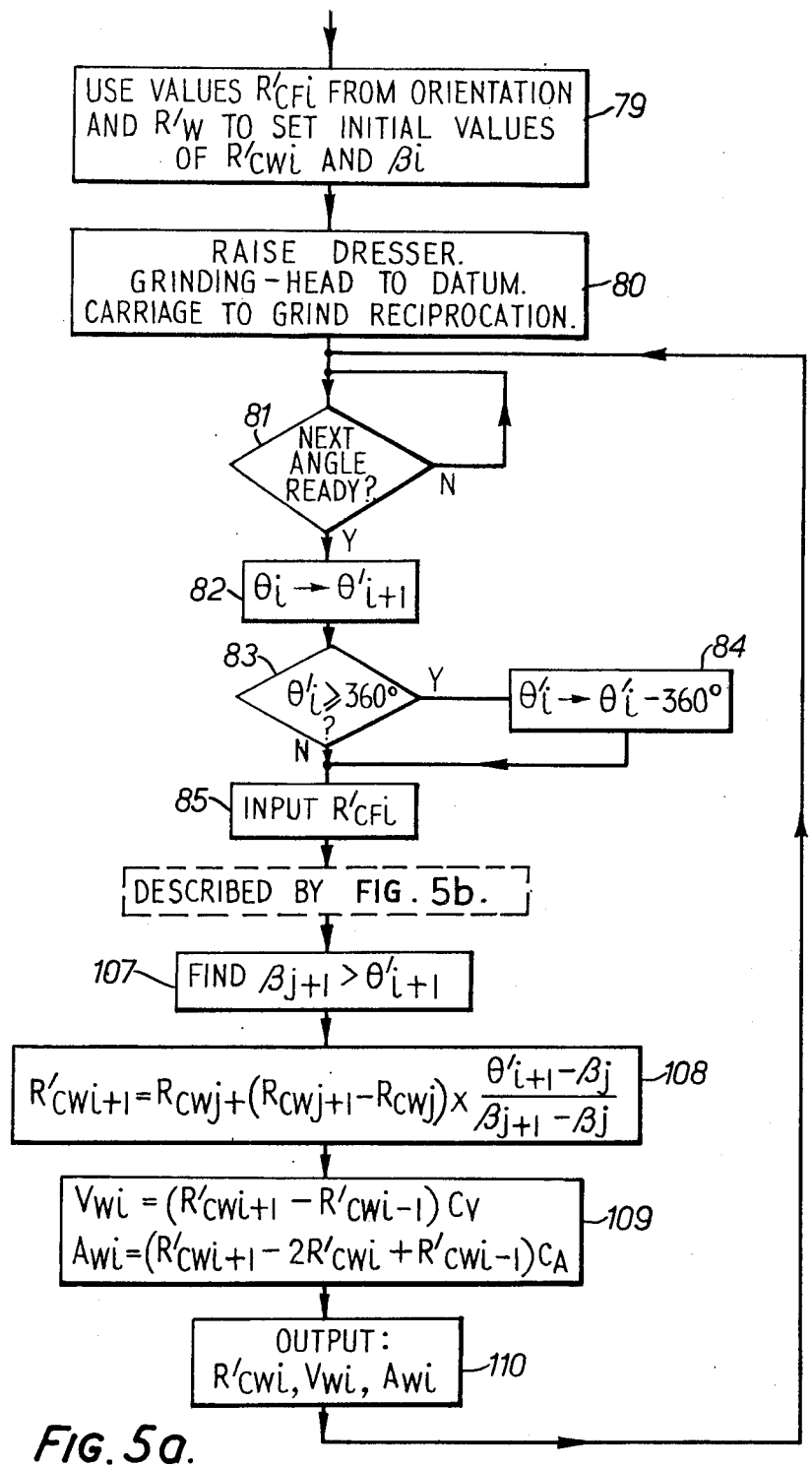
Figure 5B:
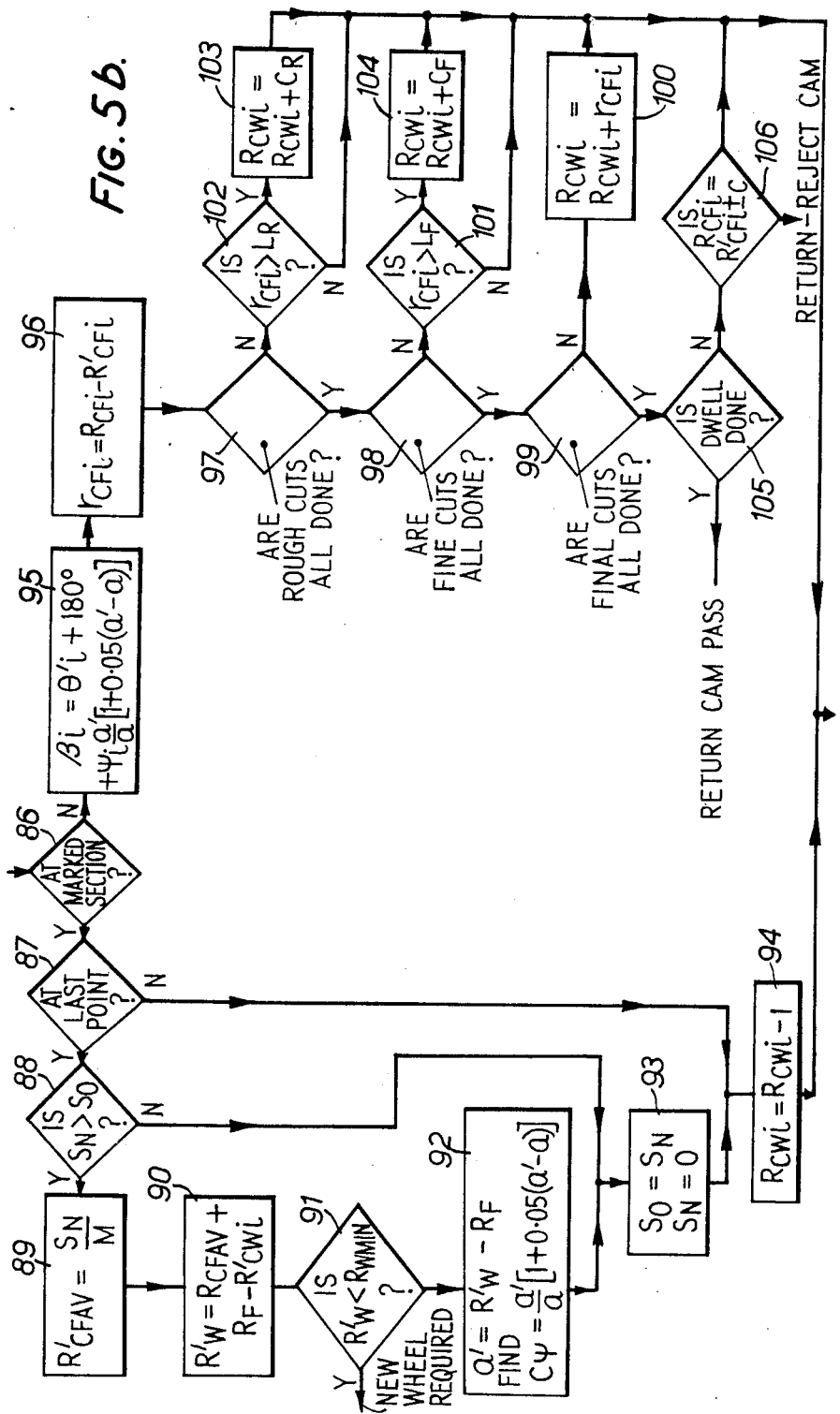

Function 60, the grinding process, will now be described with reference to FIG. 5.

To commence this process initial values of grinding head position ($R_{cwi}$) and output angles ($\beta_i$) are used. These are calculated from equation 1, using $R'_w$ as calculated during dressing, and from equations 4, 5 and 6. The values of $R_{cwi}$ are modified by a small amount to allow an initial clearance between the cam and the grinding wheel (function 79).

The machine is then set up for grinding by lifting the dresser and by setting the carriage 26 to grind in reciprocation (function 80).

The computer then enters a programme loop which is synchronised (function 81) to the interrupt pulses generated by the cam angular position sensor 16. At each interrupt pulse, the cam position counter ($\theta'_i$) is incremented (functions 82, 83 and 84), a probe reading ($R'_{CFi}$) is taken (function 85), a new value of wheel position ($R_{cwi}$) is calculated for future use, and a value of ($R'_{cwi}$) for output at $\theta'_i$ is found.

In addition, a suitable constant radius section has previously been "marked" for use in checking grinding wheel radius ($R'_w$) and is detected by function (86). On detection of this section, the programme enters the sequence consisting of functions 87 to 94. This sequence checks the grinding wheel radius and, if it is too small, causes a warning signal to be emitted indicating that a new wheel is required. If the marked section is not detected, the programme advanced to function 95 which determines $\beta_i$ using equation (4). The programme then advances to function 96 which determines the cut size by calculating the amount left to cut ($r_{cfi}$) at $\theta'_i$. The part of the programme denoted by functions 97 to 104 then compares $r_{cfi}$ with the rough and fine cut limits ($L_R, L_F$). Initially, rough cuts are made until a complete revolution of the cam is made with no rough cuts required. At this stage fine cuts commence, and, when a complete revolution of the cam is made with no fine cuts required, fine cutting is considered complete and all the remaining metal is cut in one revolution. At this stage, function 105 causes a predetermined number of dwell (no cutting) revolutions to be made during which the cam is checked against the stored reference data (function 106). (This cutting procedure is given as an example and may not be the final method used).

The grinding wheel position to be output at $\theta'_i$ has already been calculated, and the value for output at $\theta'_{i+1}$ is determined by searching up the table of values of $\beta_j$ until a value $\beta_{j+1}$ is found which is just greater than $\theta'_{i+1}$ (function 107). By definition $\beta_j$ is then less than $\theta'_{i+1}$ and $R_{cwj}$ can be used to calculate $R'_{cwi+1}$ for output at the next interrupt (function 108).

Figure 6:
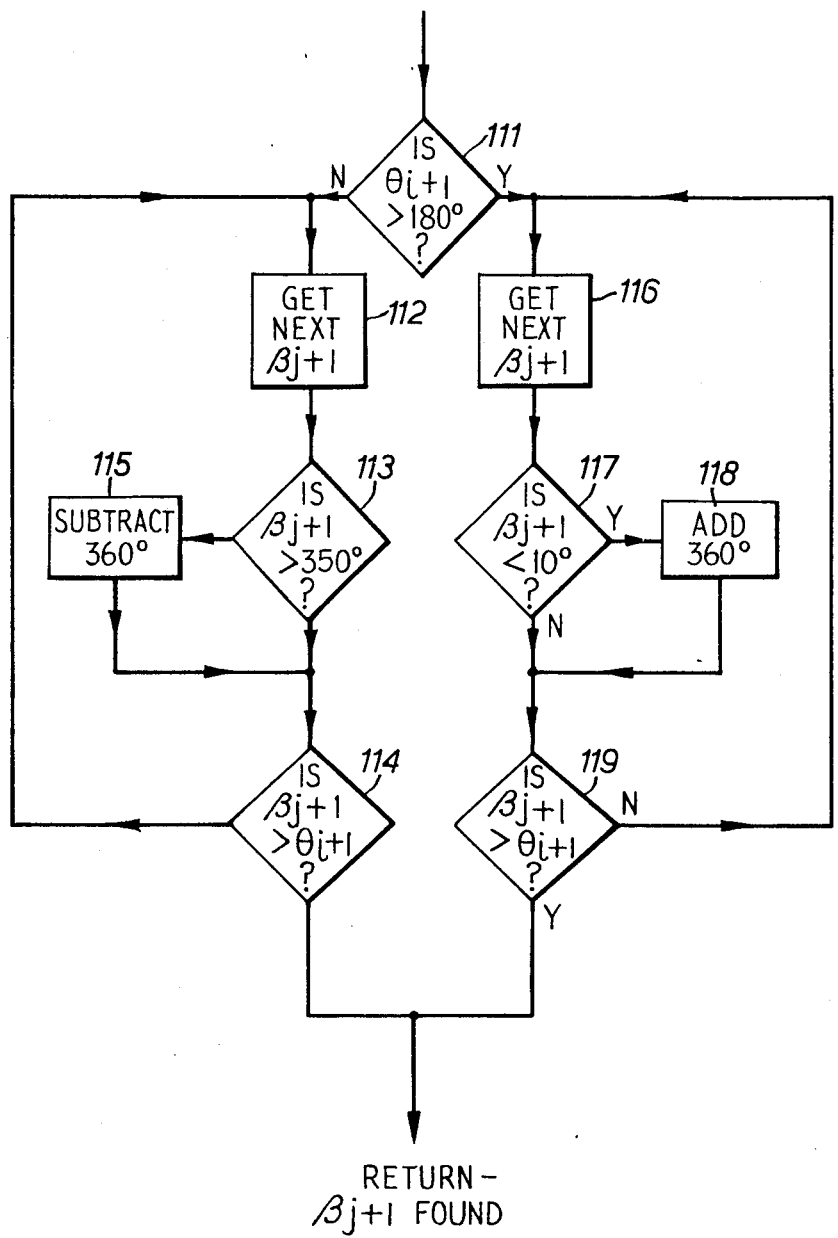

Suitable programming techniques must be used to overcome problems as $\beta_j$ passes through 359°/0°. These are described with reference to FIG. 6, which is a more detailed description of function 107. When $\theta'_{i+1}$ is large (>180° and approaching 359°) as determined by function 111, a search through values of $\beta_j$ may pass through 360°. To detect this checks are made for small values of $\beta_j$ (function 117); when such a value occurs it is increased by 360° to give continuity (function 118). When $\theta'_{i+1}$ is small (>180° and just above 0°) a search through values of $\beta_j$ may give large values ($\approx 350°$) which would be immediately detected as larger than $\theta'_{i+1}$ and give erroneous results. To prevent this happening checks are made for large values of $\beta_j$ in function 113; when such a value occurs it is decreased by 360° by function 115 to give continuity.

Returning to FIG. 5, when $V_{wi}$ and $A_{wi}$ have been calculated by function 109, they are output together with $R'_{cwi}$ by function 110.

We claim:

1. A control system for controlling the position of a rotating tool acting on a workpiece to form a non-circular profile on the workpiece, the system comprising: first motor means for adjusting the position of the tool; first position sensor means for providing a first digital signal representing the actual position of the tool; a second positive sensor means for providing a third digital signal indicative of the actual angular position of the workpiece; third position sensor means for providing a fourth digital signal representative of the position of a follower engaging the machined surface of the workpiece at a position angularly spaced from the tool in relation to the axis of angular movement of the workpiece; and digital computer means having a memory for information defining a desired non-circular profile for the workpiece, the second and third position sensor means being coupled to feed the computer means which is programmed to produce a second digital signal, indicative of a desired position for the tool, in dependence upon a selected portion of said stored information, which portion is selected by use of the third signal to compensate for tool wear; and comparator means responsive to any difference between the values represented by the first digital signal and the second digital signal indicative of a desired position for the tool for controlling the first motor means so as to reduce the difference.

2. A control system as claimed in claim 1, and comprising second motor means for angularly displacing the workpiece, and a controller for the second motor means, the computer being programmed to provide a digital desired value signal for said controller.

3. A control system as claimed in claim 1, wherein each position sensor means comprises an optical grating device.

4. A control system as claimed in claim 1, wherein said store also has storage for values of the offset angle which is the difference between the angular position of a given point of the follower in relation to the axis of the workpiece and the angular position of the axis of the tool in relation to the axis of the workpiece when the follower and workpiece are acting on the same point of the workpiece profile.

5. A control system as claimed in claim 4, wherein the computer means is programmed such that the information in the memory represents desired values of the profile in terms of desired values ($R_{CF}$) of said given point of the follower; to calculate, and store, desired values ($R_{CW}$) of tool radial position from the values ($R_{CF}$) and given values of the tool radius ($R_W$) and the follower dimension ($R_F$) from its given point to its point of contact with the workpiece; and to calculate, and store, for each desired value ($R_{CW}$) the corresponding angular tool position ($\beta$) in relation to the workpiece axis, the position ($\beta$) being calculated in dependence upon said offset angle.

6. A control system as claimed in claim 5, wherein the computer means is programmed so that the fourth digital signal is stored to provide actual values of follower position ($R'_{CF}$), and, intermittently, an actual value ($R'_W$) is calculated for tool radius from said actual values ($R'_{CF}$), the said follower dimension ($R_F$) and from the tool radial position ($R'_{CW}$) which has produced the said actual values ($R'_{CF}$), the current actual value ($R'_W$) being the given value of tool radius employed to calculate desired values ($R_{CW}$) of tool radial position.

7. A control system as claimed in claim 6, wherein the computer means is programmed so that the tool angular positions ($\beta$) are calculated from compensated values of offset angle, these compensated values being calculated from the stored offset angles in dependence upon the current actual tool radius ($R'_W$).

8. A control system as claimed in claim 5, wherein the computer means is programmed such that said second digital signal is produced in each case in dependence upon the desired value ($R_{CW}$) of tool radial position corresponding to a tool angular position ($\beta$) corresponding to the current follower angular position, the desired value ($R_{CW}$) being found by interpolation between the two values of tool angular position between which exists the current follower angular position.

9. A control system as claimed in claim 1, wherein the computer is programmed to define a plurality of machining cycles, in each cycle the second digital signal representing a desired value closer to the finally required desired value than in the preceding cycle.

10. A control system as claimed in claim 1, wherein the computer is programmed to cause the follower to trace the workpiece profile, before machining, and to identify from the measured values an angular reference position for the workpiece giving a best fit between the stored values of the desired profile and the actual profile of the workpiece.

11. A control system as claimed in claim 1, wherein the computer is programmed to provide a control signal component for the first motor means in dependence upon the rate of change of the stored information with workpiece angle.

12. A control system as claimed in claim 5, wherein the computer is programmed to provide a control signal component for the first motor means in dependence upon the rate of change of said desired values ($R_{CF}$) of tool radial position.

* * * * *